(12) United States Patent
Etter

(10) Patent No.: US 6,283,465 B1
(45) Date of Patent: Sep. 4, 2001

(54) CLAMPING DEVICE

(75) Inventor: Ernst Etter, Thalwil (DE)

(73) Assignee: Vischer & Bolli AG (DE)

( * ) Notice: Subject to any disclaimer, the term of this patent is extended or adjusted under 35 U.S.C. 154(b) by 0 days.

(21) Appl. No.: 09/487,896

(22) Filed: Jan. 19, 2000

(30) Foreign Application Priority Data

Jan. 20, 1999 (DE) .............................................. 199 01 977

(51) Int. Cl.$^7$ ................................................... B23Q 3/00
(52) U.S. Cl. ........................................................ 269/309
(58) Field of Search ................................... 269/309, 310, 269/32, 48.1; 29/263, 252, 33 P; 279/2.06, 2.09; 198/345.3, 345.2; 409/134, 219, 225, 172, 174; 408/70, 87

(56) References Cited

U.S. PATENT DOCUMENTS

| 5,415,384 | * | 5/1995 | Obrist | 269/309 |
| 5,918,870 | * | 7/1999 | Stark | 269/309 |
| 5,961,261 | * | 10/1999 | Stark | 409/219 |
| 6,073,325 | * | 6/2000 | Stark | 29/33 |

FOREIGN PATENT DOCUMENTS

| 3322232A1 | 3/1984 | (DE) | B22D/19/00 |
| 4135418 A1 | 5/1993 | (DE) | B23G/1/00 |
| 2980473 | 7/1998 | (DE) | |
| 2981699 | 10/1998 | (DE) | |
| 0827805 A1 | 3/1997 | (EP) | B23Q/1/00 |
| 0858862 A1 | 2/1998 | (EP) | B23G/7/14 |

* cited by examiner

Primary Examiner—Joseph J. Hail, III
Assistant Examiner—Daniel Shanley
(74) Attorney, Agent, or Firm—Liniak, Berenato, Longacre & White, LLC

(57) ABSTRACT

The invention is a clamping device for fastening a draw-in bolt to a machine table or a baseplate. The clamping device has a piston axially displaceable in a recess of the machine table and which is also hydraulically actuateable. The clamping device also has a cover, a clamping mechanism, and an integral bushing positioned in the machine table recess. At least one of the piston and the cover form a receptacle into which the draw-in bolt can be inserted through the cover and fastened to the clamping device by the clamping mechanism. The clamping mechanism is actuateable by displacement of the piston. The piston is also displaceable in the bushing with the bushing and the piston cooperating to form a pressure space. The cover is fastened to and centered upon the bushing and is fastenable to the machine table in order to close off the recess.

9 Claims, 1 Drawing Sheet

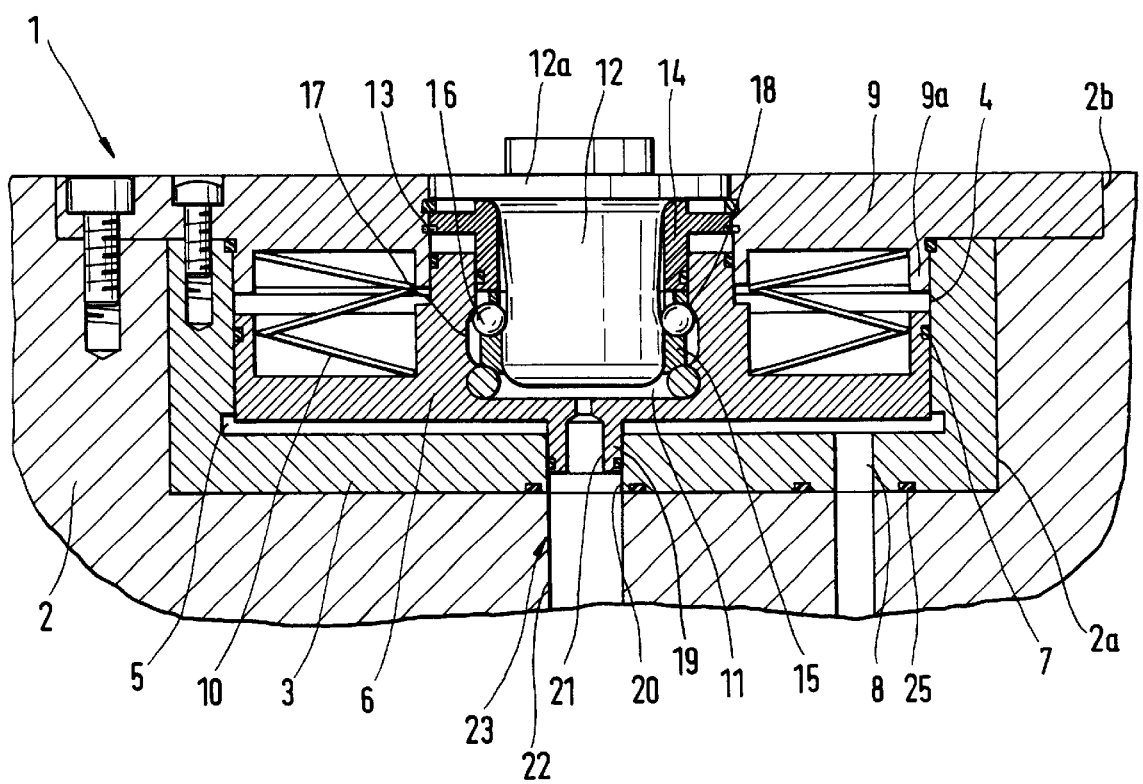

CLAMPING DEVICE

FIELD OF THE INVENTION

The present invention concerns a clamping device for fastening a draw-in bolt to a machine table, a baseplate, or the like, having a piston that is arranged axially displaceably in a recess of the machine table and is hydraulically actuable, and having a cover that is fastenable to the machine table in order to close off the recess, the piston and/or the cover forming a receptacle into which a draw-in bolt can be inserted through the cover and in which it can be fastened by way of a clamping mechanism that is actuable by displacement of the piston.

BACKGROUND OF THE INVENTION

The machining of workpieces is often very complex, and can comprise a plurality of chip-generating and non-chip-generating operations on different processing machines in order to produce the finished component from a blank. In all production sequences, it is essential in this context that the workpiece assume a defined position on the respective machine tool for each operation.

For this purpose, it is usual in practice first to clamp the unmachined workpiece onto a carrier pallet, and then to clamp the entire unit onto the respective machine tool, by way of multiple draw-in bolts that are provided on the back side of the carrier pallet and are configured as centering elements, by the fact that the draw-in bolts are inserted into corresponding quick clamping units that are provided on the machine table. In production, it is possible in this manner to regard the positions of the quick clamping devices as a fixed machine parameter, so that it is necessary in each case only to position the workpiece precisely on the carrier pallet. The actual clamping and reclamping of the unit comprising the workpiece and carrier pallet onto machines can then be accomplished very quickly and easily, with no need for further positioning.

The known mechanical/hydraulic clamping devices on which the present invention is based are configured either as so-called build-up cylinders—which form closed units and can be clamped onto a machine table, a baseplate, or the like—or as so-called built-in cylinders—which can be recessed into the machine tables, quick-release plates, dies, etc. The known built-in cylinders are inserted directly into a recess of the machine table or into a corresponding base element; a pressure space is then formed between the built-in cylinder and the recess of the machine table, and can be acted upon by a hydraulic medium in order to release the clamping device.

The use of such built-in cylinders often proves problematic because the machine tables often do not possess the necessary casting quality, so that the receptacles cannot be manufactured with the necessary accuracy and sealing problems thus occur. In addition, the formation of cavities can in some cases greatly degrade the service life of the pistons of the clamping devices or that of the seals. In addition, the clamping forces are directed into the machine table, base element, or the like, so that distortion can occur therein.

SUMMARY OF THE INVENTION

It is therefore the object of the present invention to describe a clamping device of the kind cited initially, suitable for mounting into a machine table or the like, which is configured so that it can easily be installed in the machine table without causing sealing problems, and which is easy to maintain.

This object is achieved, in a clamping device of the kind cited initially, in that the piston is guided displaceably in an integrally configured bushing with which it forms a pressure space; and that the cover is arranged centeredly—on the one hand on the bushing and on the other hand on the machine table.

The fact that the clamping device according to the present invention is configured as a closed unit means that the sealing problems which occur in the existing art can be eliminated. The clamping device can furthermore be configured as a standardized compact component, so that manufacturing costs can be reduced. Since positioning of the clamping device is accomplished by way of the cover, all that is necessary is to provide corresponding centers on the machine table and on the cover, with the result that machining inaccuracies in the remaining region of the receptacle play only a limited role. An annular gap that is possibly present between the receptacle and the bushing is sealed from below against oil or air by way of two O-rings.

The clamping device according to the present invention offers the further advantage that no distortions of the machine table occur during operation, since the clamping or release forces are absorbed entirely within the clamping device. In addition, the service life of the clamping devices is greatly extended because, for example, cavities in the machine table have no effect on the operation of the clamping device.

Centering of the cover on the machine table and of the bushing can be accomplished in various ways. It has proven advantageous to provide on the cover a centering extension which engages into the bushing, a sealing element then preferably being arranged between cover and bushing. For centering of the cover on the machine table, the outer rim of the cover can be configured as a centering rim which forms a fit with a depression provided on the machine table. The cover can be at least partially, but in particular completely, recessed into the machine bed, so that it terminates flush with the table surface. Provision of hydraulic medium and optionally air to the clamping device is preferably accomplished in the base region of the bushing, which is where the seal between bushing and receptacle can be accomplished most easily.

With regard to further advantageous embodiments of the invention, reference is made to the dependent claims and to the explanation below of an exemplary embodiment referring to the appended drawings. In the drawings, the single FIGURE shows in longitudinal section an embodiment of a clamping device according to the present invention having a draw-in bolt inserted and clamped in place.

BRIEF DESCRIPTION OF THE DRAWINGS

FIG. 1, cross sectional view of the inventive clamping device.

DETAILED DESCRIPTION OF THE DRAWINGS

Clamping device 1, which can be installed on a machine table 2, a baseplate, or the like, comprises a bushing 3, configured as a cylinder, which is open at its upper end and is inserted into a recess 2a of machine table 2. A piston 6 is inserted in axially movable fashion into cylinder bore 4 of bushing 3, forming a pressure space 5; the annular gap between cylinder bore 4 and piston 6 is sealed by an O-ring 7. Opening into the bottom of cylinder bore 4 is a hydraulic medium conduit 8, configured in bushing 3, through which a hydraulic medium such as, for example, oil can be delivered to pressure space 5 via a delivery line provided in machine table 2. A sealing element 25 which prevents oil leaks is provided between the bottom of bushing 3 and the bottom of recess 2a.

The open upper side of bushing 3 is closed off by a cover 9 that is held on bushing 3 in bolted-on and centered fashion, for which purpose cover 9 has, on the bushing side, a centering extension 9a that is dimensioned for a precise fit with the inside diameter of bushing 3.

Clamping device 1 is fastened to machine table 2 also via cover 9, which is immovably bolted onto machine table 2. As is readily apparent from the FIGURE, it thereby engages into a depression 2b of machine table 2 in such a way that it terminates approximately flush with the table surface. Cover 9 is held in depression 2b in centered fashion, for which purpose the outer rim of cover 9 is configured as a centering rim which forms a fit with depression 2b. Cover 9 and depression 2b are toleranced in terms of depth as well. Depression 2b and recess 2a can also have a diameter that is enlarged in defined fashion, thus making it possible to bring the cylinder even more precisely into bore gauge accuracy by filling.

As an alternative to this embodiment, cover 9 can also be centered on machine table 2 in other ways; the gap between cover 9 and machine table 2 can then be filled up with a two-component plastic material.

Also arranged between cover 9 and piston 6 is a cup spring packet 10 that pushes piston 6 downward toward the bottom of cylinder bore 4.

Provided in the upper side of piston 6, opposite pressure space 5, is a blind hole which forms a receptacle 11 for a draw-in bolt 12 that is inserted into receptacle 11 through a passthrough hole 13 provided in cover 9. A sleeve-shaped guide element 14 is provided in passthrough hole 13 to facilitate and guide this insertion operation, and for precise positioning of draw-in bolt 12 in clamping device 1 [it] is dimensioned in the upper region of passthrough hole 13 to fit a flange 12a of draw-in bolt 12.

A clamping mechanism is provided for fastening draw-in bolt 12 in receptacle 11. This mechanism comprises, in a manner known per se, a ball cage 15 in which multiple balls 16 are held in radially displaceable fashion and can slip outward, depending on the piston position, into a groove 17 in the wall of receptacle 11, so that a draw-in bolt 12 can be inserted into ball cage 15 and removed from it, or can be prevented by the wall of receptacle 11 from so slipping and thus can be held on draw-in bolt 12 in engagement with the corresponding countersurface, as depicted in the FIGURE.

In the drawing, FIG. 1 shows clamping device 1 in its clamped position, in which pressure space 5 is pressureless and piston 6 is pressed downward by cup spring packet 10 so that an upper oblique surface 18 of groove 17 holds balls 16 in engagement with draw-in bolt 12. If pressure space 5 now has pressure medium applied to it via hydraulic medium conduit 8, piston 6 is pressed upward, against the return force of cup spring packet 10, into a position in which groove 17 allows balls 16 space to slip radially outward, so that draw-in bolt 12 can be removed from clamping device 1 or can then be inserted back into it. The linear stroke of piston 6 is selected so that drawin bolt 12 is pressed upward by the bottom of receptacle 11 in order to facilitate the removal of draw-in bolt 12.

On its end surface facing toward the pressure space, piston 6 has an extension 19 that is guided displaceably in a recess 20 configured in the bottom of cylinder bore 4 and is sealed with respect thereto. Recess 20 forms, together with a conduit segment 21 of nozzle-like configuration that is provided in extension 19 and connects recess 20 to the bottom of receptacle 11 for draw-in bolt 12, and with a conduit segment 22 extending in machine bed 2, an air inlet conduit 23 that is connected to a compressed-air source (not depicted). When a draw-in bolt 12 is inserted into clamping device 1 or when draw-in bolt 12 is taken out, compressed air can be blown through this air inlet conduit 23 in order thereby to purge receptacle 11, with the ball cage and draw-in bolt 12, of chips or other contaminants, especially in the region of the fitting surfaces and the clamping mechanism. Contamination-related impairments of system accuracy can thereby be reliably prevented.

What is claimed is:

1. A clamping device (1) for fastening a draw-in bolt (12) to a machine table (2) or a baseplate, having a piston (6) axially displaceable in a recess (2a) of the machine table (2) and being hydraulically actuable, and having a cover (9), and an integral bushing (3) positioned in the recess (2a), at least one of said piston (6) and said cover (9) forming a receptacle (11) into which the draw-in bolt (12) can be inserted through said cover (9) and in which the draw-in bolt (12) can be fastened to said clamping device by a clamping mechanism that is actuable by displacement of said piston (6), said piston (6) being displaceable in said bushing (3), said bushing (3) and said piston (6) cooperate and form a pressure space (5), and said cover (9) is fastened to and centered upon said bushing (3) and is fastenable to the machine table (2) in order to close off the recess (2a).

2. The clamping device as defined in claim 1, wherein said cover (9) has a centering extension (9a) which engages into said bushing (3).

3. The clamping device as defined in claim 1, wherein a sealing element (25) is arranged between said cover (9) and said bushing (3).

4. The clamping device as defined in claim 1, wherein an outer rim of said cover (9) forms a centering rim which forms a fit with a depression (2b) provided on the machine table (2).

5. The clamping device as defined in claim 1, wherein said cover (9) can be bolted to the machine table (2).

6. The clamping device as defined in claim 1, wherein said cover (9) can be bolted to said bushing (3).

7. The clamping device as defined in claim 1, wherein said cover (9) can be at least partially recessed into the machine table (2).

8. The clamping device as defined in claim 7, wherein said cover (9) can be completely recessed into the machine table (2), so that said cover terminates flush with the table surface.

9. A flush mount clamping device for fastening a draw-in bolt to a machine table or baseplate, comprising:
a hydraulically actuable piston being axially displaceable in a recess of the machine table;
an integral bushing positioned in the recess, said piston being displaceable in said bushing and cooperating with said bushing to form a pressure space;
a clamping mechanism actuable by displacement of said piston for fastening the draw-in bolt; and
a cover fastened to and centered upon said bushing and fastenable to the machine table for closing off the recess, wherein at least one of said cover and said piston forms a receptacle into which the draw-in bolt can be inserted through said cover and fastened by said clamping mechanism.

* * * * *